US012786077B2

(12) United States Patent
Shete et al.

(10) Patent No.: US 12,786,077 B2
(45) Date of Patent: Nov. 3, 2026

(54) ISSUANCE OF HARDWARE ACCELERATION POLICY IN O-RAN

(71) Applicant: RAKUTEN MOBILE, INC., Tokyo (JP)

(72) Inventors: Pankaj Shete, Tokyo (JP); Awn Muhammad, Tokyo (JP); Kenichiro Aoyagi, Tokyo (JP); Koichiro Kitagawa, Tokyo (JP)

(73) Assignee: RAKUTEN MOBILE, INC., Tokyo (JP)

(*) Notice: Subject to any disclaimer, the term of this patent is extended or adjusted under 35 U.S.C. 154(b) by 282 days.

(21) Appl. No.: 18/557,577

(22) PCT Filed: May 2, 2022

(86) PCT No.: PCT/JP2022/019482
§ 371 (c)(1),
(2) Date: Jan. 14, 2025

(87) PCT Pub. No.: WO2023/214442
PCT Pub. Date: Nov. 9, 2023

(65) Prior Publication Data
US 2025/0150359 A1 May 8, 2025

(51) Int. Cl.
*H04L 41/40* (2022.01)
*H04L 41/0894* (2022.01)

(52) U.S. Cl.
CPC .......... *H04L 41/40* (2022.05); *H04L 41/0894* (2022.05)

(58) Field of Classification Search
CPC .... H04L 41/40; H04L 41/0894; H04W 28/16; H04W 88/085; H04W 88/18; H04W 24/02; H04W 88/12; H04W 92/12
See application file for complete search history.

(56) References Cited

U.S. PATENT DOCUMENTS

2022/0167236 A1* 5/2022 Melodia ............ H04W 28/0967
2023/0006889 A1* 1/2023 Thyagaturu ......... H04L 41/5054
(Continued)

FOREIGN PATENT DOCUMENTS

EP 3869847 A1 * 8/2021 ............ H04W 16/02
JP 2021083058 A 5/2021

OTHER PUBLICATIONS

Andres Garcia-Saavedra et al., "O-RAN: Disrupting the Virtualized RAN Ecosystem," IEE Communications Standards Magazine; Dec. 2021, 8 pp.

*Primary Examiner* — Benjamin M Thieu
(74) *Attorney, Agent, or Firm* — HAUPTMAN HAM, LLP

(57) ABSTRACT

A radio access network control apparatus has at least one processor that performs: by a hardware acceleration policy issuance unit in a Non-RT RIC (Non-Real Time RAN Intelligent Controller) of an O-RAN, issuing a hardware acceleration policy concerning hardware acceleration in a radio access network node managed virtually by a virtual infrastructure. The hardware acceleration policy issuance unit provides the hardware acceleration policy to the outside of the Non-RT RIC through the interface inside the SMO (Service Management and Orchestration) including the Non-RT RIC. The hardware acceleration policy issuance unit provides the hardware acceleration policy to a hardware acceleration management unit in the virtual infrastructure.

18 Claims, 8 Drawing Sheets

(56) References Cited

U.S. PATENT DOCUMENTS

| | | | | |
|---|---|---|---|---|
| 2024/0196178 | A1* | 6/2024 | Ying | H04W 8/18 |
| 2024/0236766 | A1* | 7/2024 | Shete | H04L 41/0894 |
| 2024/0259879 | A1* | 8/2024 | Ranganath | G06N 5/01 |
| 2025/0227646 | A1* | 7/2025 | Fan | H04W 24/02 |
| 2025/0254714 | A1* | 8/2025 | Garcia-Saavedra | H04L 67/10 |

* cited by examiner

ISSUANCE OF HARDWARE ACCELERATION POLICY IN O-RAN

RELATED APPLICATIONS

The present application is a National Phase of International Application Number PCT/JP2022/019482, filed May 2, 2022.

BACKGROUND OF THE INVENTION

1. Field of the Invention

The present disclosure relates to issuance of hardware acceleration policy in an O-RAN.

2. Description of the Related Art

For the purpose of the so-called open radio access network (RAN) in a mobile communication system, "Open RAN", "O-RAN", "vRAN" etc. are being considered. In this specification, "O-RAN" is used as a comprehensive term for such various "open radio access networks". Therefore, the interpretation of "O-RAN" in this specification is not limited to the standard and/or the specification of the same name "O-RAN" specified by the O-RAN Alliance. In an O-RAN, a virtual infrastructure also referred to as O-Cloud that virtually manages a set of a plurality of radio access network nodes (RAN nodes) is provided.

Patent Literature 1: JP-A-2021-83058

SUMMARY OF THE INVENTION

A controller of the O-RAN comprises a Non-RT RIC (Non-Real Time RAN Intelligent Controller) and a Near-RT RIC (Near-Real Time RAN Intelligent Controller). The Non-RT RIC, which has a relatively long control cycle (e.g. 1 second or longer), executes application software called rApp. The Near-RT RIC, which has a relatively short control cycle (e.g. shorter than 1 second), executes application software called xApp. Among these controllers, the Non-RT RIC is responsible for overall control of the O-RAN. Nevertheless, a mechanism to control hardware acceleration in the RAN node has not been sufficiently defined in the conventional O-RAN.

The present disclosure was made in view of these circumstances, and its purpose is to provide a radio access network control apparatus and the like that can effectively control hardware acceleration in the RAN node.

In order to solve the above problem, a radio access network control apparatus in a certain aspect of the present disclosure comprises at least one processor that performs: by a hardware acceleration policy issuance unit in a Non-RT RIC (Non-Real Time RAN Intelligent Controller) of an O-RAN, issuing a hardware acceleration policy concerning hardware acceleration in a radio access network node managed virtually by a virtual infrastructure.

According to this aspect, hardware acceleration in the RAN node can be effectively controlled, based on the hardware acceleration policy issued by the Non-RT RIC.

Another aspect of the present disclosure is a radio access network control method. The method comprises: in a Non-RT RIC (Non-Real Time RAN Intelligent Controller) of an O-RAN, issuing a hardware acceleration policy concerning hardware acceleration in a radio access network node managed virtually by a virtual infrastructure.

Further another aspect of the present disclosure is a computer-readable medium. The computer-readable medium stores a radio access network control program causing a computer to perform: in a Non-RT RIC (Non-Real Time RAN Intelligent Controller) of an O-RAN, issuing a hardware acceleration policy concerning hardware acceleration in a radio access network node managed virtually by a virtual infrastructure.

In addition, any combination of the above components, and any conversion of the expression of the present disclosure among methods, devices, systems, recording media, computer programs and the like are also encompassed within this disclosure.

According to the present disclosure, hardware acceleration in a RAN node can be effectively controlled.

DETAILED DESCRIPTION OF THE INVENTION

In the following, the present embodiment is described in accordance with the "O-RAN" which is the standard and/or the specification developed by the O-RAN Alliance. Therefore, the known terms defined in "O-RAN" will be used in the present embodiment just for convenience, but the technologies according to this disclosure can be applied to other existing radio access networks such as "Open RAN" and "vRAN" and/or to similar radio access networks that may be developed in the future.

Figure 1:
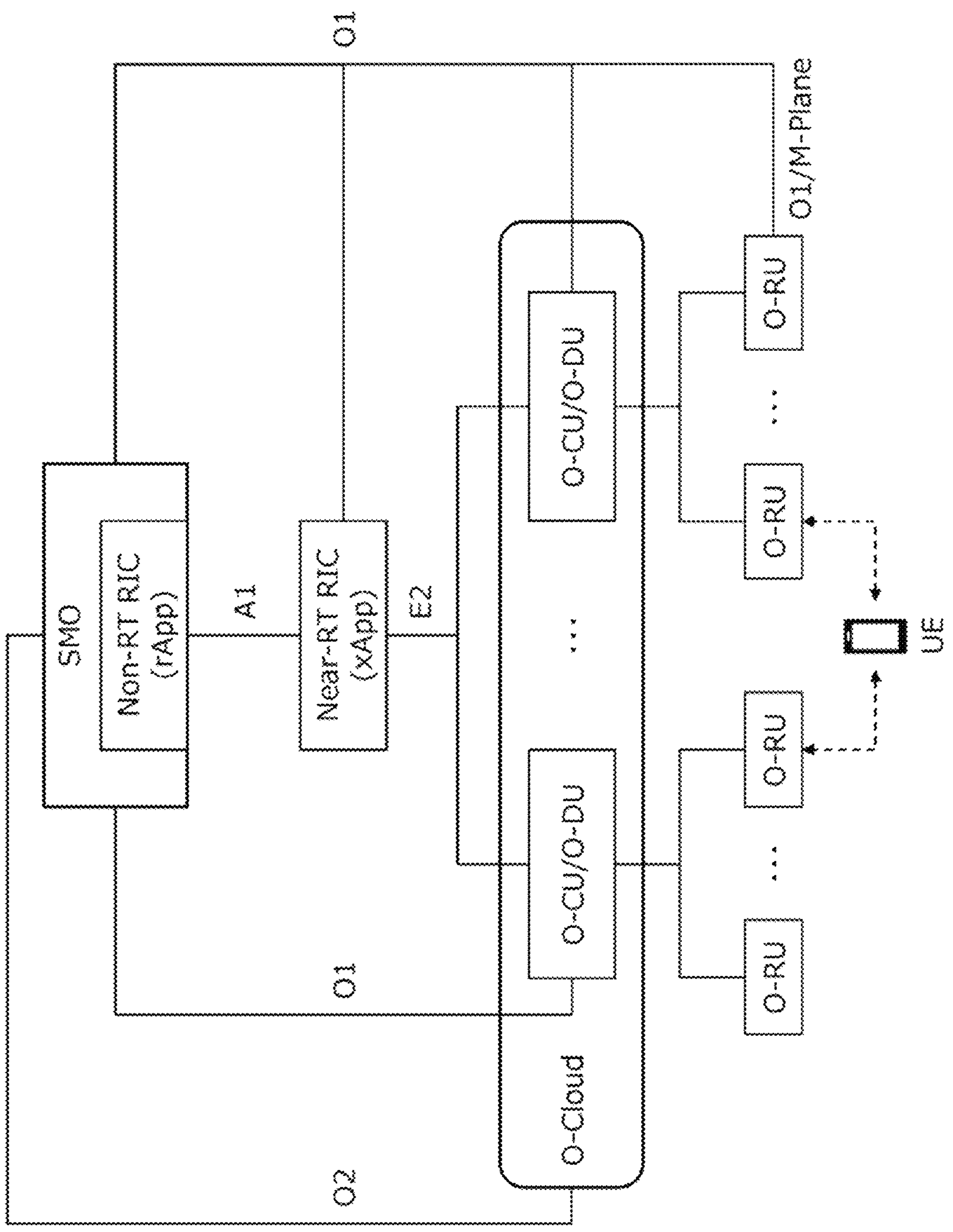
FIG. 1 is a schematic overview of a radio access network control apparatus.

FIG. 1 shows a schematic overview of the radio access network control apparatus according to the present embodiment. This radio access network control apparatus is a RAN control apparatus that controls radio access network in accordance with the O-RAN. The SMO (Service Management and Orchestration) controls the entire RAN control apparatus or the entire O-RAN and coordinates the operations of each portion. The SMO is equipped with a Non-RT RIC (Non-Real Time RAN Intelligent Controller) that functions as the overall control processor responsible for overall control. The Non-RT RIC, which has a relatively long control cycle (e.g. 1 second or longer), issues guidelines, policies, guidance etc. concerning the operation of each RAN node (O-CU and/or O-DU as described below). Specifically, the Non-RT RIC executes application software called rApp to issue operational policy for each RAN node to the Near-RT RIC (Near-Real Time RAN Intelligent Controller) through the A1 interface. The Near-RT RIC, which has a relatively short control cycle (e.g. shorter than 1 second), executes application software called xApp to control each RAN node (O-CU/O-DU) itself and/or general-purpose hardware etc. in the radio unit (O-RU) connected to each of the RAN nodes through the E2 interface.

The illustrated RAN node has an O-CU, which is an O-RAN compliant central unit (CU), and/or O-DU, which is an O-RAN compliant distributed unit (DU). Both of the O-CU and the O-DU are responsible for baseband processing in the O-RAN, where the O-CU is provided on the side of the core network (not shown in the figure), and the O-DU is provided on the side of the O-RU, which is an O-RAN compliant radio unit (RU). The O-CU may be divided into the O-CU-CP, which constitutes the control plane (CP), and the O-CU-UP, which constitutes the user plane (UP). The O-CU and the O-DU may be integrally configured as a single baseband processing unit. The O-eNB as a base station compliant with the O-RAN and the 4th generation mobile communication system (4G), may be provided as a RAN node. One or more O-RUs are connected to each RAN node (O-CU/O-DU) and are controlled by the Near-RT RIC via each of the RAN nodes. A communication device (UE: User Equipment) in the communication cell provided by each O-RU can be connected to each of the O-RUs, and can perform mobile communication with the core network (not shown) via each RAN node (O-CU/O-DU).

Each RAN node (O-CU/O-DU) and the Near-RT RIC provide operational data etc. of each RAN node, each O-RU and each UE through the O1 interface to the SMO for so-called FCAPS (Fault, Configuration, Accounting, Performance, Security). The SMO updates as necessary the operational policy for each RAN node issued by the Non-RT RIC to the Near-RT RIC through the A1 interface, based on the operational data acquired through the O1 interface. The O-RUs may be connected to the SMO for the FCAPS by the O1 interface and/or other interfaces (e.g. Open Fronthaul M-Plane).

The O-Cloud as a virtual infrastructure that virtually manages a set of the plurality of RAN nodes (O-CUs/O-DUs) is connected to the SMO by an O2 interface. The SMO generates a resource allocation policy concerning the resource allocation and/or a workload management policy concerning the workload management of the plurality of RAN nodes, based on the operational states of the plurality of RAN nodes (O-CUs/O-DUs) acquired from the O-Cloud through the O2 interface, and issues them to the O-Cloud through the O2 interface.

Figure 2:
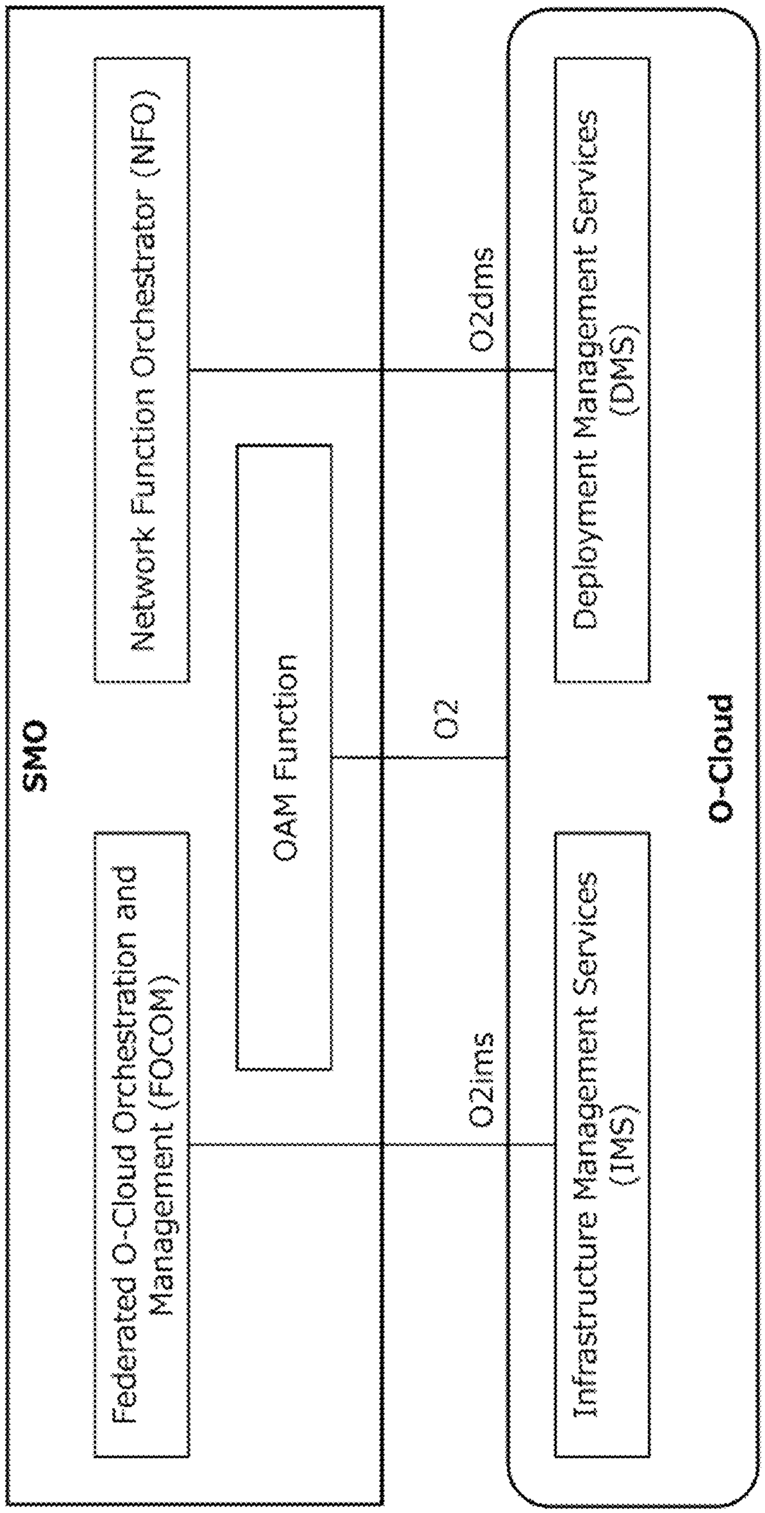
FIG. 2 schematically shows various functions realized in the SMO and/or the Non-RT RIC and O-Cloud.

FIG. 2 schematically shows the various functions realized in the SMO and/or the Non-RT RIC and the O-Cloud. In the SMO, three main functions are realized, which are the FOCOM (Federated O-Cloud Orchestration and Management), the NFO (Network Function Orchestrator) and the OAM Function. In the O-Cloud, two main functions are realized, which are the IMS (Infrastructure Management Services) and the DMS (Deployment Management Services).

The FOCOM manages resources in the O-Cloud, while receiving services from the IMS of the O-Cloud through the O2 interface (O2ims). The NFO realizes the orchestrated operation of a set of network functions (NFs) by a plurality of NF Deployments in the O-Cloud, while receiving services from the DMS of the O-Cloud through the O2 interface (O2dms). The NFO may utilize the OAM Function to access the deployed NFs through the O1 interface. The OAM Function is responsible for the FCAPS management of O-RAN managed entities such as the RAN nodes. The OAM Function in the present embodiment can be a functional block where callbacks are provided for receiving data concerning failures and/or operational states of the plurality of RAN nodes that are virtually managed by the O-Cloud, by monitoring processes or procedures over the O2ims and/or the O2dms. The IMS is responsible for managing the O-Cloud resources (hardware) and/or the software used for managing them, and provides services primarily to the FOCOM of the SMO. One or more DMSs are responsible for the management of the plurality of NF Deployments in the O-Cloud, specifically the initiation, monitoring, termination etc., and provides services primarily to the NFO of the SMO.

Figure 3:
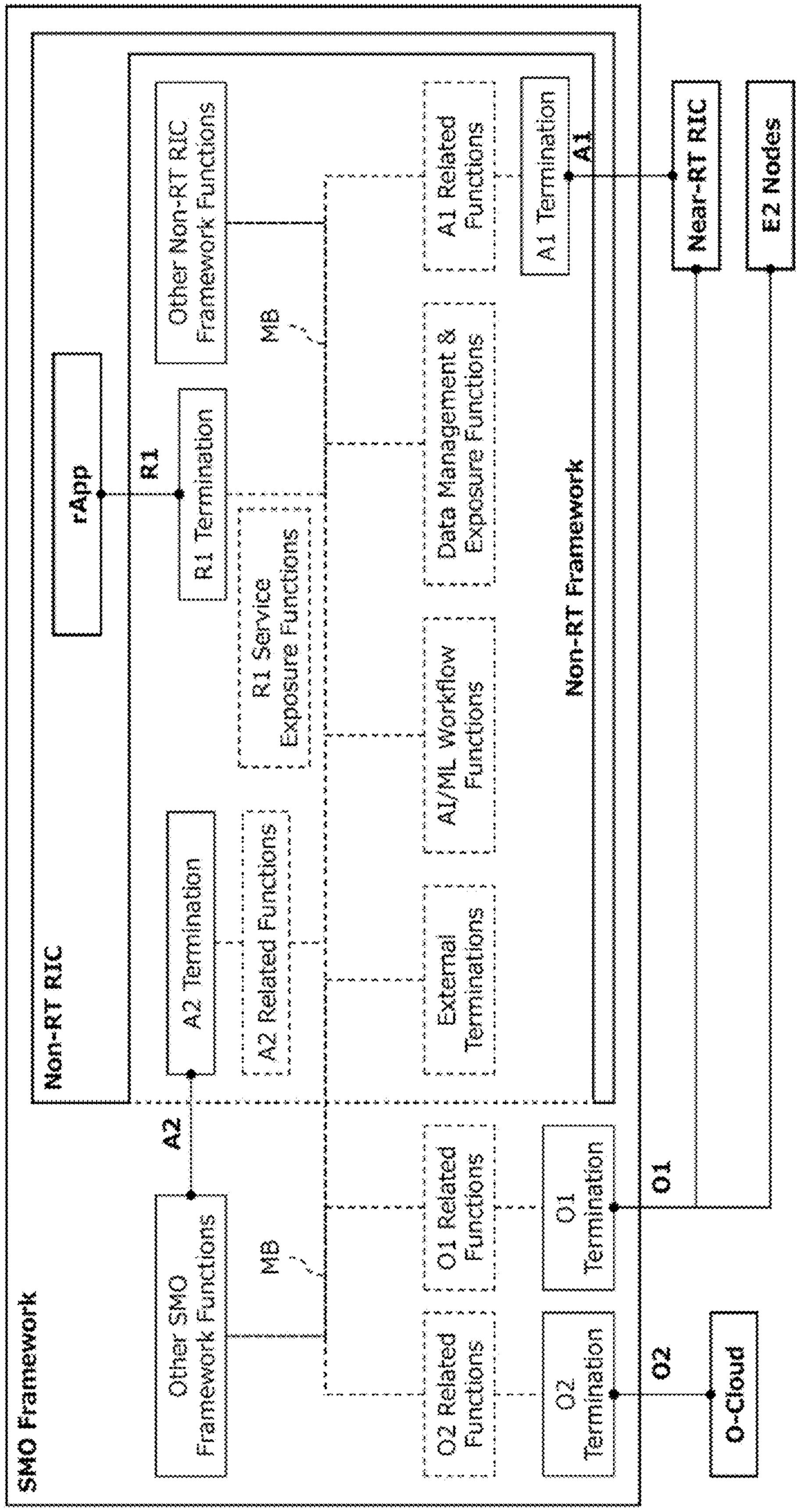
FIG. 3 is a schematic representation of structures and/or functions inside the SMO and/or the Non-RT RIC.

FIG. 3 is a schematic representation of structures and/or functions inside the SMO and/or the Non-RT RIC. The SMO or the SMO framework includes the Non-RT RIC. Inside the Non-RT RIC is divided into the Non-RT framework or the Non-RT RIC framework and the rApp. The solid lines in this figure represent functional blocks and/or connections defined in the O-RAN. The dotted lines in this figure represent functional blocks and/or connections that can be implemented in the O-RAN.

In the SMO framework excluding the Non-RT RIC, the O1 Termination, the O1 Related Functions, the O2 Termination, the O2 Related Functions, and the Other SMO Framework Functions are provided. The O1 Termination is the termination of the O1 interface in the SMO framework. As also shown in FIG. 1, the O1 Termination is connected to the Near-RT RIC and/or the E2 nodes (RAN nodes such as O-CUs/O-DUs, O-RU etc.) via the O1 interface. The O1 Related Functions directly connected the O1 Termination provide various functions related to the O1 interface, the Near-RT RIC, the E2 node etc. The O2 Termination is the termination of the O2 interface in the SMO framework. As also shown in FIG. 1, the O2 Termination is connected to the O-Cloud via the O2 interface. The O2 Related Functions directly connected the O2 Termination provide various functions related to the O2 interface, the O-Cloud etc. The Other SMO Framework Functions provide other functions except for the O1 Related Functions and the O2 Related Functions. The Other SMO Framework Functions are connected to the A2 Termination (described below) in the Non-RT RIC via the A2 interface. Various functions of the SMO framework such as the O1 Related Functions, the O2 Related Functions, and the Other SMO Framework Functions, are connected to the main bus MB extending also inside the Non-RT RIC. Each of these functional blocks can exchange data with other functional blocks inside and outside the SMO framework (or inside and outside the Non-RT RIC) through the main bus MB.

In the Non-RT framework, which is the area of the Non-RT RIC excluding the rApp, the A1 Termination, the A1 Related Functions, the A2 Termination, the A2 Related Functions, the R1 Termination, the R1 Service Exposure Functions, the External Terminations, the Data Management & Exposure Functions, the AI (Artificial Intelligence)/ML (Machine Learning) Workflow Functions, and the Other Non-RT RIC Framework Functions are provided.

The A1 Termination is the termination of the A1 interface in the Non-RT framework. As also shown in FIG. 1, the A1 Termination is connected to the Near-RT RIC via the A1 interface. The A1 Related Functions directly connected the A1 Termination provide various functions related to the A1 interface, the Near-RT RIC etc. The A2 Termination is the termination of the A2 interface in the Non-RT framework. The A2 Termination is connected to the Other SMO Framework Functions of the SMO framework via the A2 interface. The A2 Related Functions directly connected the A2 Termination provide various functions related to the A2 interface, the Other SMO Framework Functions etc.

The R1 Termination is the termination of the R1 interface in the Non-RT framework. The R1 Termination is connected to the rApp running on the Non-RT RIC via the R1 interface. In other words, the R1 interface constitutes the API (Application Programming Interface) for the rApp. The R1 Service Exposure Functions accompanying the R1 Termination provide the function of disclosing data related to services such as the R1 interface and the rApp to the main bus MB etc. and/or provide the function of disclosing data from the main bus MB etc. to the R1 Termination etc. for services such as the R1 interface and the rApp. The External Terminations are terminations of various external interfaces (not shown) in the Non-RT framework.

The Data Management & Exposure Functions manage various data on the main bus MB, and provide the function of disclosing them in a manner in accordance with the access right of each functional block. The AI/ML Workflow Functions provide the function of managing workflows executed using the artificial intelligence (AI) capability and/or the machine learning (ML) capability implemented in the Non-RT RIC and/or the Near-RT RIC. The Other Non-RT RIC Framework Functions provide other functions except for the above various Non-RT framework functions. Various functions of the Non-RT framework such as the A1 Related Functions, the A2 Related Functions, the R1 Termination, the R1 Service Exposure Functions, the External Terminations, the Data Management & Exposure Functions, the AI/ML Workflow Functions, and the Other Non-RT RIC Framework Functions, are connected to the main bus MB extending also outside the Non-RT RIC. Each of these functional blocks can exchange data with other functional blocks inside and outside the Non-RT RIC through the main bus MB.

Figure 4:
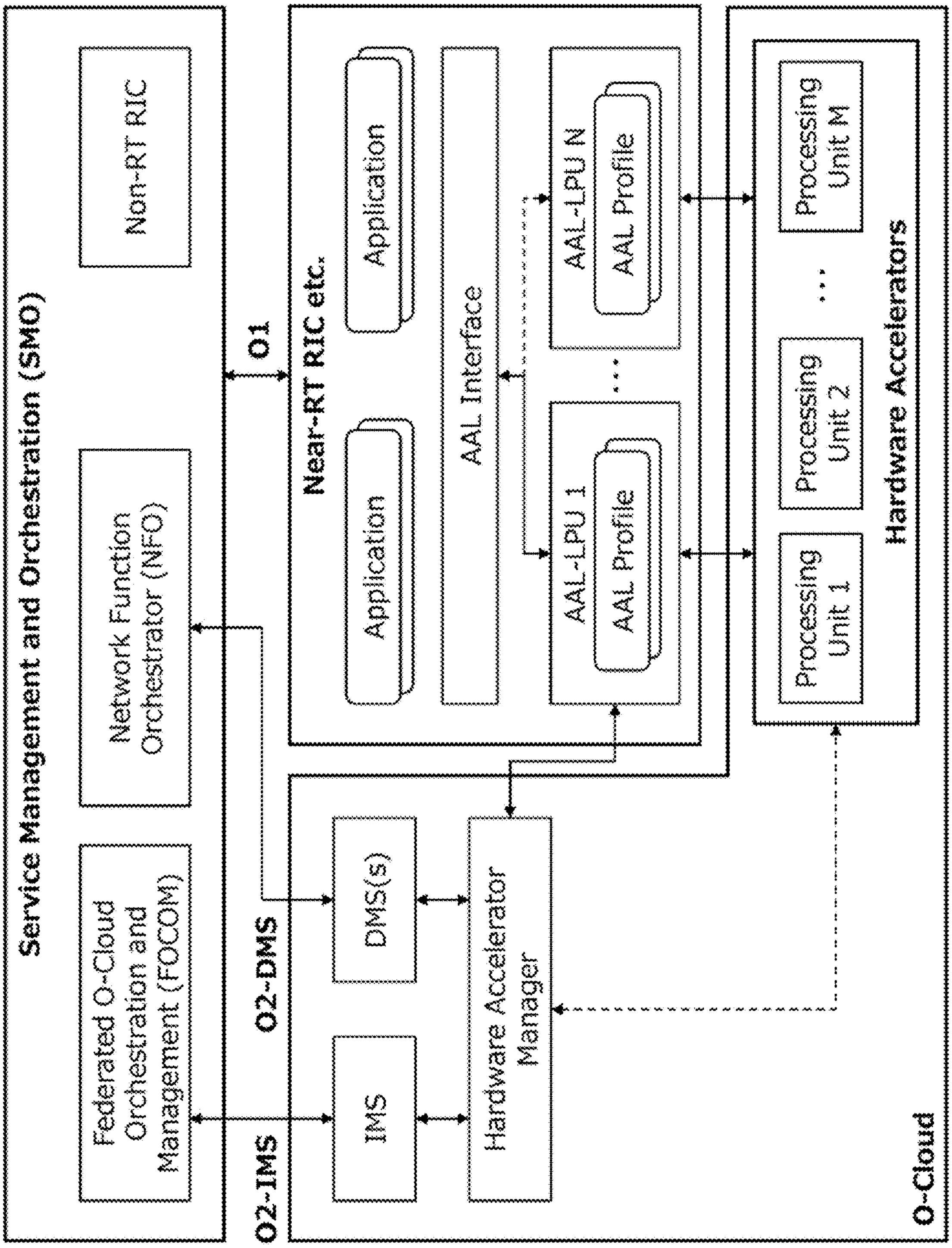
FIG. 4 shows an example where hardware acceleration is applied to a RAN node managed virtually by the O-Cloud.

FIG. 4 shows an example of hardware acceleration applied to a RAN node managed virtually by the O-Cloud. Hardware acceleration is a technology to support a general-purpose processor such as a CPU (Central Processing Unit) by means of hardware equipped with circuits that are specialized or customized for specific processes and/or applications. Examples of those special-purpose hardware include FPGA (Field-Programmable Gate Array), GPU (Graphics Processing Unit), ASIC (Application Specific Integrated Circuit), DSP (Digital Signal Processor) etc., and are hereinafter collectively referred to as specialized processor, hardware accelerator, HW accelerator etc. for convenience. Even complex processes that require a lot of time and power in software processing by a general-purpose processor can be executed at high speed and efficiency by a specialized processor with hardware implementation.

Figure 5A:
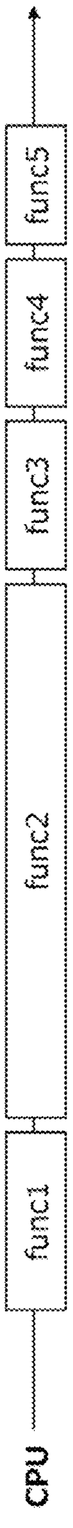
FIG. 5 is a schematic representation of the concept of hardware acceleration.
Figure 5B:
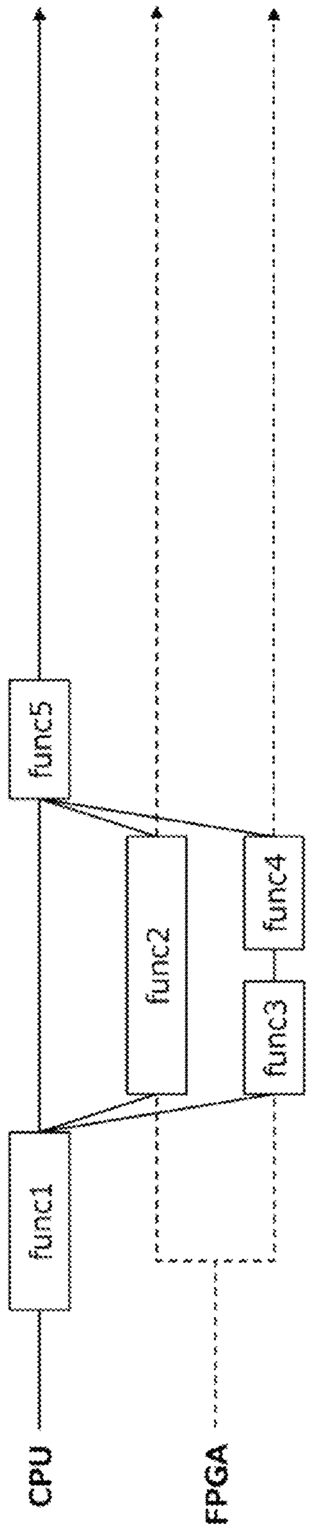

FIG. 5 schematically illustrates the concept of hardware acceleration. FIG. 5A shows an example of "without hardware acceleration" in which a CPU as a general-purpose processor serially executes a series of processes or functions "func1" to "func5". FIG. 5B shows an example of "with hardware acceleration" in which an FPGA as a specialized processor is provided in addition to the CPU as a general-purpose processor. The CPU does not execute some of the series of processes or functions "func2" to "func4" by itself, but has the FPGA equipped with the customized circuits execute them. The FPGA in the example shown in the figure can not only execute "func2" and "func3/4" in parallel, but also execute each process or function "func2" to "func4" faster than the CPU. As a result, the "with hardware acceleration" example in FIG. 5B can execute a series of processes or functions "func1" to "func5" faster and more efficiently than the "without hardware acceleration" example in FIG. 5A.

In FIG. 4, a general-purpose processor is omitted and only the HW accelerator group (Hardware Accelerators) is shown as the target or the object of hardware acceleration. The HW accelerator group includes a plurality (M) of processing units "Processing Unit 1" to "Processing Unit M" as specialized processors, hardware accelerators, and HW accelerators. These processing unit "Processing Unit 1" to "Processing Unit M" are arbitrary baseband processing units included in baseband units (BBUs) of one or more RAN nodes that are virtually managed by the O-Cloud. As mentioned above, the baseband unit of the RAN node is generally divided into central unit (O-CU) on the core network side and distributed unit (O-DU) on the O-RU side. As such, the processing units "Processing Unit 1" to "Processing Unit M" shown in the figure are arbitrary baseband processing units included in at least one of the central unit (O-CU) and distributed unit (O-DU) of these baseband units.

This HW accelerator group is managed by a HW accelerator management unit (Hardware Accelerator Manager) as a hardware acceleration management unit in the O-Cloud. The HW accelerator management unit is responsible for lifecycle management, configuration, updates and/or upgrades, error handling etc. of the HW accelerator group managed by the O-Cloud. The performance and/or monitoring data of the HW accelerator management unit is shared by an application to the SMO through the O1 interface. The HW accelerator management unit is connected to the IMS and the DMS of the O-Cloud as also shown in FIG. 2. The IMS provides the HW accelerator management unit with various information acquired from the FOCOM of the SMO through the O2-IMS interface. One or more DMSs provide the HW accelerator management unit with various information acquired from the NFO of the SMO through the O2-DMS interface. The HW accelerator management unit manages the HW accelerator group through an AAL-LPU (Acceleration Abstraction Layer Logical Processing Unit) group as described below, based on various information provided from the IMS and/or the DMS.

In the Near-RT RIC and/or the central unit (O-CU) connected to the SMO through the O1 interface, a mechanism is provided to manage the HW accelerator group in cooperation with the HW accelerator management unit in the O-Cloud. Specifically, the AAL interface and the AAL logical processing unit (AAL-LPU) group are provided. The AAL interface is an application interface between various O-RAN applications running on the Non-RT RIC, the Near-RT RIC etc., and the AAL (Acceleration Abstraction Layer). For example, each network function (Application) that is cooperatively operated by the NFO of the SMO can access the AAL logical processing unit group and/or the HW accelerator group through the AAL interface.

The AAL logical processing unit group includes a plurality (N) of AAL logical processing units "AAL-LPU 1" to "AAL-LPU N". The AAL logical processing unit group is a logical representation of resources (especially hardware resources) included in the HW accelerator group. Each AAL logical processing unit included in the AAL logical processing unit group is an arbitrary combination of some or all of the resources in one or more processing units included in the HW accelerator group. Via the AAL interface, the appropriate AAL logical processing unit in accordance with each O-RAN application is selected and made active. Each AAL logical processing unit stores one or more AAL profiles (AAL Profile) by its resources. Although not shown in the figure, each AAL profile lists one or more accelerated functions (AF) to be realized by the resources included in the AAL logical processing unit. These accelerated functions specify the processing units (at least one of "Processing Unit 1" to "Processing Unit M") and/or their specific resources that should actually be used or operated in the HW accelerator group, when such AAL profile is selected by the active AAL logical processing unit. As described in more detail below, the active AAL logical processing unit selects the appropriate AAL profile in accordance with the O-RAN situation, in cooperation with the HW accelerator management unit in the O-Cloud.

Figure 6:
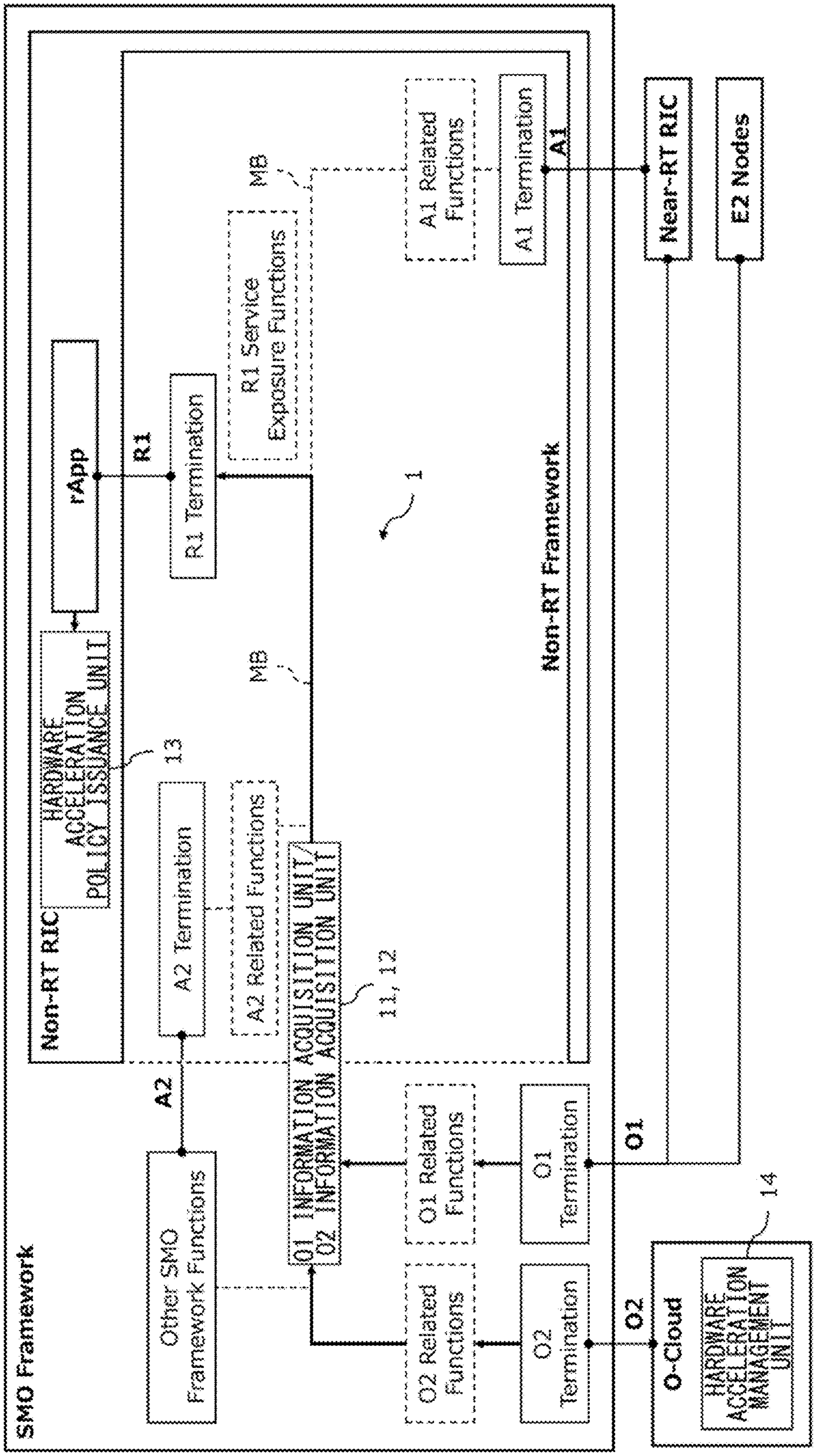
FIG. 6 is a functional block diagram schematically showing a radio access network control apparatus.
Figure 7:
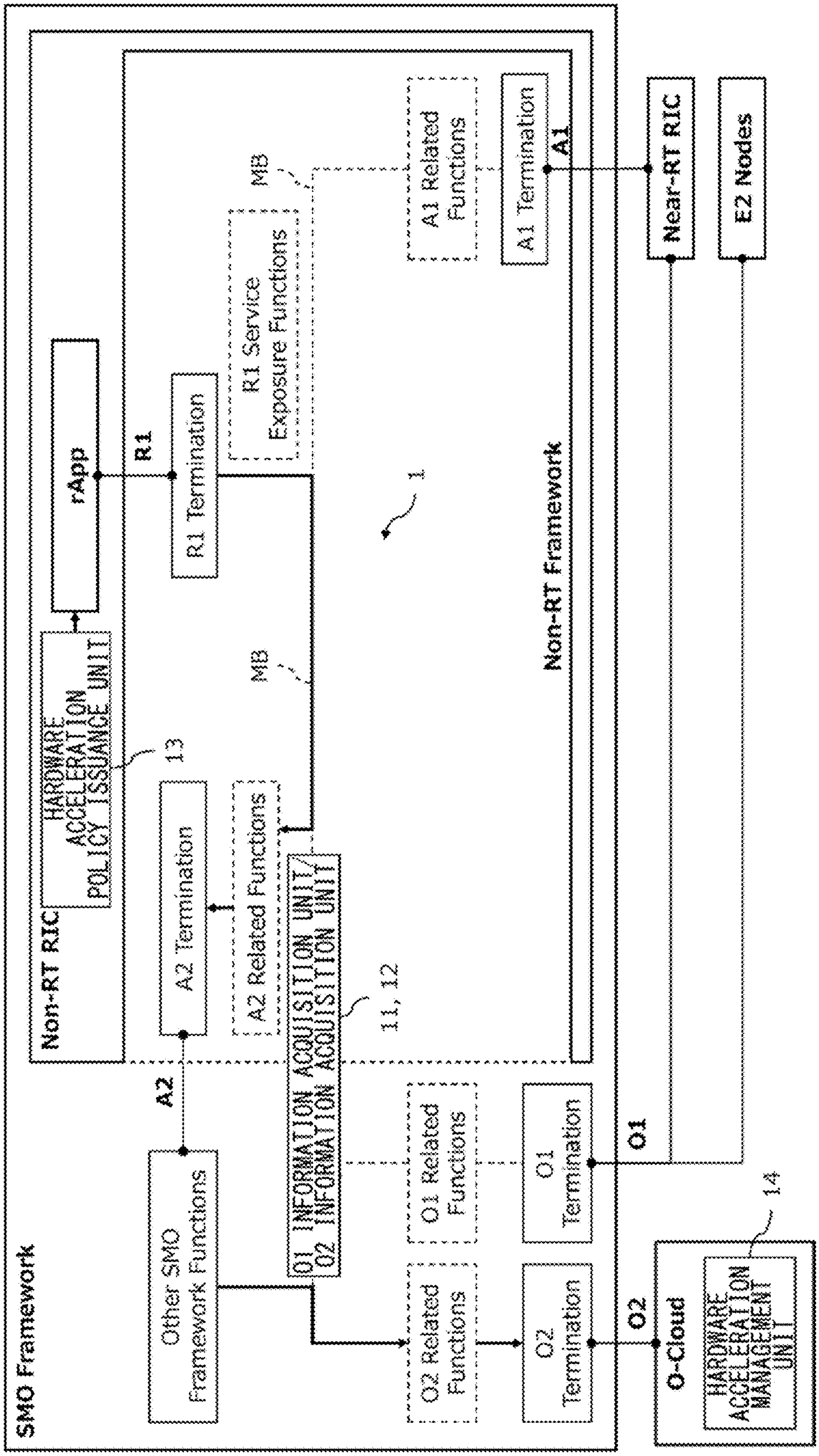
FIG. 7 is a functional block diagram schematically showing a radio access network control apparatus.

FIGS. 6 and 7 are functional block diagrams schematically showing the radio access network control apparatus 1 according to the present embodiment. The radio access network control apparatus 1 is provided in the SMO framework and/or the Non-RT framework in FIG. 3, except for the hardware acceleration management unit 14 in the O-Cloud, which corresponds to the "Hardware Accelerator Manager" in FIG. 4. In this figure, some functional blocks in FIG. 3 (specifically, the External Terminations, the Data Management & Exposure Functions, the AI/ML Workflow Functions, and the Other Non-RT RIC Framework Functions) are omitted.

The radio access network control apparatus 1 comprises an O1 information acquisition unit 11, an O2 information acquisition unit 12, a hardware acceleration policy issuance unit 13, and a hardware acceleration management unit 14. These functional blocks are realized by the cooperation of hardware resources, such as the central processing unit, memory, input devices, output devices, and peripheral devices connected to the computer, and software that is executed using them. Regardless of the type of computer or its installation location, each of the above functional blocks may be realized with the hardware resources of a single computer, or by combining hardware resources distributed across plurality of computers. Especially in the present embodiment, some or all of the functional blocks of the radio access network control apparatus 1 may be realized in a computer and/or a processor provided in the Non-RT RIC, the SMO and/or the O-Cloud, or may be realized in an external computer and/or an external processor that can communicate with at least one of the Non-RT RIC, the SMO and/or the O-Cloud in a distributed manner or a centralized manner.

The O1 information acquisition unit 11 acquires O1 information concerning at least one of the Near-RT RIC and the E2 node (RAN node) through the O1 interface. Specifically, the O1 information acquisition unit 11 is provided in the SMO and/or the Non-RT RIC and acquires the O1 information from the Near-RT RIC and/or the E2 node through the O1 interface. Examples of the O1 information include various control information representing the control state of the Near-RT RIC and/or individually measured operational data for each E2 node. The operational data of each E2 node can be various data detectable in a base station of normal mobile communication. Examples of the operational data include: the communication volume per time period and/or the communication speed; the number and/or the type of connected UEs (communication devices); the strength and/or the mode of communication signal from UE; the quality of the channel between UE and O-RU; the coverage and/or the available bandwidth of the communication cell provided by O-RU; and the capability and/or the state etc. of the hardware of E2 node and/or O-RU.

The O1 information acquisition unit 11 in FIGS. 6 and 7 is shown schematically on the main bus MB, spanning inside and outside the Non-RT framework. However, the O1 information acquisition unit 11 can be provided in whole or in part within the SMO framework outside the Non-RT framework. Besides, as long as the O1 information acquisition unit 11 can access the relevant functional blocks within the SMO, specifically the O1 Termination, the O1 Related Functions, the R1 Termination, the R1 Service Exposure Functions, the rApp, the hardware acceleration policy issuance unit 13 etc., it does not have to be directly connected to the main bus MB. Among these relevant functional blocks, the O1 Related Functions inside the SMO framework (outside the Non-RT framework) is the most relevant, where some or all of the functions of the O1 information acquisition unit 11 are preferably realized.

The O2 information acquisition unit 12 acquires O2 information concerning the O-Cloud through the O2 interface. Specifically, the O2 information acquisition unit 12 is provided in the SMO and/or the Non-RT RIC and acquires the O2 information from the O-Cloud through the O2 interface. Examples of the O2 information include information concerning configuration and/or telemetry of the O-Cloud and/or failure and/or operational state of each E2 node (each RAN node) that is virtually managed by the O-Cloud. Examples of the operational state of each E2 node include resource usage status and communication load status in each E2 node. These O2 information may be acquired, for example, from the IMS in the O-Cloud through the O2ims interface by the FOCOM in the SMO, and/or from the O-Cloud through the O2 interface by the OAM Function in the SMO.

The O2 information acquisition unit 12 in FIGS. 6 and 7 is shown schematically on the main bus MB, spanning inside and outside the Non-RT framework. However, the O2 information acquisition unit 12 can be provided in whole or in part within the SMO framework outside the Non-RT framework. Besides, as long as the O2 information acquisition unit 12 can access the relevant functional blocks within the SMO, specifically the O2 Termination, the O2 Related Functions, the R1 Termination, the R1 Service Exposure Functions, the rApp, the hardware acceleration policy issuance unit 13 etc., it does not have to be directly connected to the main bus MB. Among these relevant functional blocks, the O2 Related Functions inside the SMO framework (outside the Non-RT framework) is the most relevant, where some or all of the functions of the O2 information acquisition unit 12 are preferably realized.

The hardware acceleration policy issuance unit 13 provided in the Non-RT RIC issues a hardware acceleration policy concerning hardware acceleration in a RAN node or an E2 node managed virtually by the O-Cloud. Specifically, all or part of the hardware acceleration policy issuance unit 13 is realized by the rApp executed by the Non-RT RIC. As shown schematically by the arrows in FIG. 6, the hardware acceleration policy issuance unit 13 in the rApp and/or the Non-RT RIC, acquires the O1 information acquired by the O1 information acquisition unit 11 and/or the O2 information acquired by the O2 information acquisition unit 12, through the main bus MB, the R1 Termination, the R1 interface etc. Based on the O1 information (concerning the Near-RT RIC and/or the E2 node) and/or the O2 information (concerning the O-Cloud), the hardware acceleration policy issuance unit 13 can issue appropriate hardware acceleration policy in accordance with the O-RAN situation.

The hardware acceleration policy issued by the hardware acceleration policy issuance unit 13 concerns hardware acceleration in at least one of the central unit (0-CU) and the distributed unit (O-DU) of the baseband unit of the RAN node. As shown schematically by the arrows in FIG. 7, the hardware acceleration policy issuance unit 13 in the rApp and/or the Non-RT RIC, provides the hardware acceleration policy to the Other SMO Framework Functions outside the Non-RT RIC, through the R1 interface, the R1 Termination, the main bus MB, the A2 Related Functions, the A2 Termination, the A2 interface etc. The Other SMO Framework Functions provides the hardware acceleration policy provided from the hardware acceleration policy issuance unit 13 to the hardware acceleration management unit 14 in the O-Cloud, through the main bus MB, the O2 Related Functions, the O2 Termination, the O2 interface etc. For example, the hardware acceleration policy issued by the hardware acceleration policy issuance unit 13 is provided, as shown in FIG. 4, from the NFO in the SMO to the DMS in the O-Cloud through the O2-DMS interface in the O2 interface, and further to the hardware acceleration management unit 14 (Hardware Accelerator Manager). The Other SMO Framework Functions may provide the hardware acceleration policy provided from the hardware acceleration policy issuance unit 13 to the Near-RT RIC and/or the E2 node, through the main bus MB, the O1 Related Functions, the O1 Termination, the O1 interface etc. It should be noted that the hardware acceleration policy issuance unit 13 in the rApp and/or the Non-RT RIC may provide the hardware acceleration policy to the outside of the Non-RT RIC and the SMO without the A2 interface. Specifically, the hardware acceleration policy may be provided to the hardware acceleration management unit 14 in the O-Cloud outside the Non-RT RIC and outside the SMO, through the R1 interface, the R1 Termination, the main bus MB, the O2 Related Functions, the O2 Termination, the O2 interface etc.

As shown in FIG. 4, the "Hardware Accelerator Manager" as the hardware acceleration management unit 14 has the active AAL logical processing unit ("AAL-LPU 1" in the example in FIG. 4) select appropriate AAL profile in accordance with the O-RAN situation, according to the hardware acceleration policy provided from the hardware acceleration policy issuance unit 13 through the O2 interface. In this way, various accelerated functions listed in the AAL profile selected according to the hardware acceleration policy issued by the hardware acceleration policy issuance unit 13, will be realized by various hardware resources of the HW accelerators (Processing Unit 1-M) included in the HW accelerator group (Hardware Accelerators). Thus, according to the present embodiment, the hardware acceleration in the RAN node can be effectively controlled, based on the hardware acceleration policy issued by the Non-RT RIC (hardware acceleration policy issuance unit 13). It should be noted that part or all of the hardware acceleration policy issued by the hardware acceleration policy issuance unit 13 may be provided to the Near-RT RIC through the A1 interface. In this case, it is possible to effectively execute the hardware acceleration control in RAN nodes, from both the O-Cloud (hardware acceleration management unit 14) and the Near-RT RIC.

Figure 8:
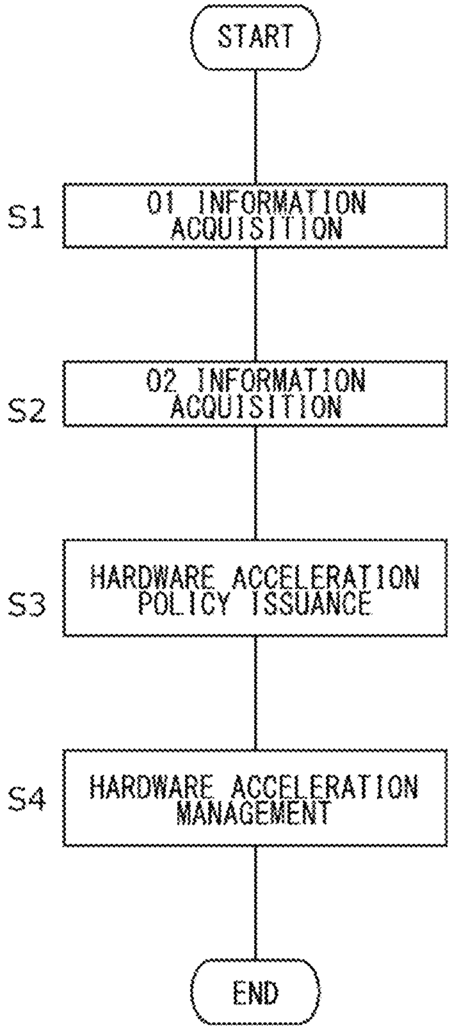
FIG. 8 is a flowchart showing an example of hardware acceleration control by the radio access network control apparatus.

FIG. 8 is a flowchart showing an example of the hardware acceleration control by the radio access network control apparatus 1. "S" in the flowchart means step and/or process.

In S1, the O1 information acquisition unit 11 acquires the O1 information concerning at least one of the Near-RT RIC and the E2 node through the O1 interface. For example, the Non-RT RIC where the hardware acceleration policy issuance unit 13 is provided, transmits subscription request for the performance data of the HW accelerator management unit (Hardware Accelerator Manager) and/or the AAL profile being deployed in the active AAL logical processing unit, from the application layer (user space) through the O1 interface.

In S2, the O2 information acquisition unit 12 acquires the O2 information concerning the O-Cloud through the O2 interface. For example, the Non-RT RIC framework where the hardware acceleration policy issuance unit 13 is provided, transmits discovery request for cloud inventory data in the IMS (e.g. number of unused or in-use hardware processing units, utilization rate, power consumption etc.) via the OAM. This discovery results are shared with the Non-RT RIC by the OAM of the SMO framework. Besides, the Non-RT RIC that has recognized a specific service in the O-Cloud, transmits subscription request to the IMS of the O-Cloud through the O2-IMS interface to collect data.

In S1 and/or S2, the OAM Function of the SMO may enable the subscription of the E2 node for data collection.

In S3, the hardware acceleration policy issuance unit 13 provided in the Non-RT RIC issues the hardware acceleration policy concerning the hardware acceleration in the RAN node or the E2 node managed virtually by the O-Cloud. Specifically, the Non-RT RIC inputs various O1 information (e.g. application performance data and/or accelerator monitoring data) and/or various O2 information (e.g. performance data and/or configuration data of the HW accelerator) acquired in S1 and/or S2, to the trained artificial intelligence/machine learning model deployed through the AI/ML Workflow Functions (FIG. 3). Based on the output from the artificial intelligence/machine learning model, the hardware acceleration policy issuance unit 13 issues the hardware acceleration policy for realizing the appropriate mapping of the AAL logical processing unit group and the HW accelerator group in accordance with the O-RAN situation, and/or for allowing the active AAL logical processing unit to select the appropriate AAL profile in accordance with the O-RAN situation. This hardware acceleration policy is provided to the NFO of the SMO as an A2 policy through the A2 interface, and is further provided to the DMS and the hardware acceleration management unit 14 (Hardware Accelerator Manager) in the O-Cloud.

In S4, the hardware acceleration management unit 14 has the active AAL logical processing unit select the appropriate AAL profile in accordance with the O-RAN situation, according to the hardware acceleration policy provided in S3. The hardware acceleration management unit 14 receives feedback from the AAL logical processing unit group and/or the HW accelerator group on whether the execution results of the hardware acceleration policy were good or bad etc. This feedback is provided to the NFO of the SMO via the DMS, and further to the hardware acceleration policy issuance unit 13 in the Non-RT RIC and/or the rApp.

When applying the above described embodiment to the existing "O-RAN" specified by the O-RAN Alliance, it is preferable to make the following changes to the SMO framework and/or the Non-RT RIC framework.

Change 1: The Non-RT RIC should be able to issue policy and/or guidance to the SMO (NFO) from the perspective of deployment of AAL logical processing units.

Change 2: Internal interface (A2 interface) specifications should be described from the perspective of policy issuance.

Change 3: The A2 interface should be able to issue policy to the SMO for the optimization of the O-Cloud resources (addition, reduction etc.) and/or for maintaining efficient use of hardware resources.

Change 4: Services from the HW accelerator management unit should be added to the O1 related services and/or the O2 related services so that they can be received by the Non-RT RIC.

Change 5: The SMO function (NFO) should support triggering the Non-RT RIC from the perspective of deployment of AAL profiles.

The present disclosure has been described above based on embodiments. It is obvious to those skilled in the art that various variations are possible in the combination of each component and/or each process in the exemplary embodiments, and that such variations are also encompassed within the scope of the present disclosure.

It should be noted that the structures, the operations, and the functions of each apparatus and/or each method described in the embodiments can be realized by hardware resources or software resources, or by the cooperation of hardware resources and software resources. As hardware resources, for example, processors, ROMs, RAMs and various integrated circuits can be used. As software resources, for example, programs such as operating systems and applications can be used.

The present disclosure may be expressed as the following items.

1. A radio access network control apparatus comprising at least one processor that performs:

by a hardware acceleration policy issuance unit in a Non-RT RIC (Non-Real Time RAN Intelligent Controller) of an O-RAN, issuing a hardware acceleration policy concerning hardware acceleration in a radio access network node managed virtually by a virtual infrastructure.

2. The radio access network control apparatus according to item 1, wherein the hardware acceleration policy issuance unit provides the hardware acceleration policy to the outside of the Non-RT RIC through the A2 interface inside the SMO (Service Management and Orchestration) including the Non-RT RIC.

3. The radio access network control apparatus according to item 1 or 2, wherein the hardware acceleration policy issuance unit provides the hardware acceleration policy to the virtual infrastructure through the O2 interface.

4. The radio access network control apparatus according to item 3, wherein the hardware acceleration policy issuance unit provides the hardware acceleration policy to a hardware acceleration management unit in the virtual infrastructure.

5. The radio access network control apparatus according to any of items 1 to 4, wherein the hardware acceleration policy issuance unit issues the hardware acceleration policy by the rApp executed by the Non-RT RIC.

6. The radio access network control apparatus according to any of items 1 to 5, wherein the at least one processor further performs, by an O2 information acquisition unit, acquiring O2 information concerning the virtual infrastructure through the O2 interface, and the hardware acceleration policy issuance unit issues the hardware acceleration policy based on the O2 information.

7. The radio access network control apparatus according to any of items 1 to 6, wherein the at least one processor further performs, by an O1 information acquisition unit, acquiring O1 information concerning at least one of a Near-RT RIC (Near-Real Time RAN Intelligent Controller) and the radio access network node through the O1 interface, and the hardware acceleration policy issuance unit issues the hardware acceleration policy based on the O1 information.

8. The radio access network control apparatus according to any of items 1 to 7, wherein the hardware acceleration policy issuance unit issues the hardware acceleration policy concerning hardware acceleration in a baseband unit of the radio access network node.

9. The radio access network control apparatus according to item 8, wherein the hardware acceleration policy issuance unit issues the hardware acceleration policy concerning hardware acceleration in at least one of a central unit and a distributed unit of the baseband unit.

10. The radio access network control apparatus according to any of items 1 to 9, wherein the virtual infrastructure is an O-Cloud of the O-RAN.

11. A radio access network control method comprising:

in a Non-RT RIC (Non-Real Time RAN Intelligent Controller) of an O-RAN, issuing a hardware acceleration policy concerning hardware acceleration in a radio access network node managed virtually by a virtual infrastructure.

12. A computer-readable medium storing a radio access network control program causing a computer to perform:

in a Non-RT RIC (Non-Real Time RAN Intelligent Controller) of an O-RAN, issuing a hardware acceleration policy concerning hardware acceleration in a radio access network node managed virtually by a virtual infrastructure.

The present disclosure relates to issuance of hardware acceleration policy in an O-RAN.

1 radio access network control apparatus, 11 O1 information acquisition unit, 12 O2 information acquisition unit, 13 hardware acceleration policy issuance unit, 14 hardware acceleration management unit.

What is claimed is:

1. A radio access network control apparatus comprising at least one processor that performs:

by a hardware acceleration policy issuance unit in a Non-RT RIC (Non-Real Time RAN Intelligent Controller) of an O-RAN, issuing a hardware acceleration policy concerning hardware acceleration in a radio access network node managed virtually by a virtual infrastructure, wherein the hardware acceleration policy specifies an AAL (Acceleration Abstraction Layer) profile to be selected by an active AAL logical processing unit, the AAL profile listing one or more accelerated functions to be realized by hardware accelerator resources.

2. The radio access network control apparatus according to claim 1, wherein the hardware acceleration policy issuance unit provides the hardware acceleration policy to an outside of the Non-RT RIC through an A2 interface inside an SMO (Service Management and Orchestration) including the Non-RT RIC.

3. The radio access network control apparatus according to claim 1, wherein the hardware acceleration policy issuance unit provides the hardware acceleration policy to the virtual infrastructure through an O2 interface.

4. The radio access network control apparatus according to claim 3, wherein the hardware acceleration policy issuance unit provides the hardware acceleration policy to a hardware acceleration management unit in the virtual infrastructure.

5. The radio access network control apparatus according to claim 1, wherein the hardware acceleration policy issuance unit issues the hardware acceleration policy by an rApp executed by the Non-RT RIC.

6. The radio access network control apparatus according to claim 1, wherein the at least one processor further performs, by an O2 information acquisition unit, acquiring O2 information concerning the virtual infrastructure through an O2 interface, and the hardware acceleration policy issuance unit issues the hardware acceleration policy based on the O2 information.

7. The radio access network control apparatus according to claim 1, wherein the at least one processor further performs, by an O1 information acquisition unit, acquiring O1 information concerning at least one of a Near-RT RIC (Near-Real Time RAN Intelligent Controller) and the radio access network node through an O1 interface, and the hardware acceleration policy issuance unit issues the hardware acceleration policy based on the O1 information.

8. The radio access network control apparatus according to claim 1, wherein the hardware acceleration policy issuance unit issues the hardware acceleration policy concerning hardware acceleration in a baseband unit of the radio access network node.

9. The radio access network control apparatus according to claim 8, wherein the hardware acceleration policy issuance unit issues the hardware acceleration policy concerning hardware acceleration in at least one of a central unit and a distributed unit of the baseband unit.

10. The radio access network control apparatus according to claim 1, wherein the virtual infrastructure is an O-Cloud of the O-RAN.

11. The radio access network control apparatus according to claim 1, wherein the hardware acceleration policy specifies a mapping between an AAL logical processing unit group and a hardware accelerator group in the virtual infrastructure.

12. The radio access network control apparatus according to claim 1, wherein the hardware acceleration policy issuance unit receives feedback concerning execution results of the hardware acceleration policy from a hardware acceleration management unit in the virtual infrastructure.

13. A radio access network control method comprising:

in a Non-RT RIC (Non-Real Time RAN Intelligent Controller) of an O-RAN, issuing a hardware acceleration policy concerning hardware acceleration in a radio access network node managed virtually by a virtual infrastructure, wherein the hardware acceleration policy specifies an AAL (Acceleration Abstraction Layer) profile to be selected by an active AAL logical processing unit, the AAL profile listing one or more accelerated functions to be realized by hardware accelerator resources.

14. The radio access network control method according to claim 13, wherein the hardware acceleration policy specifies a mapping between an AAL logical processing unit group and a hardware accelerator group in the virtual infrastructure.

15. The radio access network control method according to claim 13, further comprising receiving, by a hardware acceleration policy issuance unit in the Non-RT RIC, feedback concerning execution results of the hardware acceleration policy from a hardware acceleration management unit in the virtual infrastructure.

16. A non-transitory computer-readable medium storing a radio access network control program causing a computer to perform:

in a Non-RT RIC (Non-Real Time RAN Intelligent Controller) of an O-RAN, issuing a hardware acceleration policy concerning hardware acceleration in a radio access network node managed virtually by a virtual infrastructure, wherein the hardware acceleration policy specifies an AAL (Acceleration Abstraction Layer) profile to be selected by an active AAL logical processing unit, the AAL profile listing one or more accelerated functions to be realized by hardware accelerator resources.

17. The non-transitory computer-readable medium according to claim 16, wherein the hardware acceleration policy specifies a mapping between an AAL logical processing unit group and a hardware accelerator group in the virtual infrastructure.

18. The non-transitory computer-readable medium according to claim 16, the radio access network control program is further configured to cause the computer to perform receiving feedback concerning execution results of the hardware acceleration policy from a hardware acceleration management unit in the virtual infrastructure.

* * * * *